(12) United States Patent
Nguyen et al.

(10) Patent No.: US 7,844,162 B2
(45) Date of Patent: Nov. 30, 2010

(54) METHOD FOR FABRICATING IR-TRANSMITTING CHALCOGENIDE GLASS FIBER

(75) Inventors: Vinh Q Nguyen, Fairfax, VA (US); Jasbinder S. Sanghera, Ashburn, VA (US); Ishwar D. Aggarwal, Fairfax Station, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 12/491,264

(22) Filed: Jun. 25, 2009

(65) Prior Publication Data

US 2010/0064731 A1 Mar. 18, 2010

Related U.S. Application Data

(62) Division of application No. 12/210,467, filed on Sep. 15, 2008, now Pat. No. 7,693,388.

(51) Int. Cl.
*G02B 6/00* (2006.01)
*G02B 6/02* (2006.01)
*C03B 37/023* (2006.01)

(52) U.S. Cl. ............... 385/142; 385/123; 385/141; 385/144; 65/385

(58) Field of Classification Search .......... 385/123, 385/141, 142, 144; 65/385
See application file for complete search history.

(56) References Cited

U.S. PATENT DOCUMENTS

| 3,922,648 | A | 11/1975 | Buckley | |
|---|---|---|---|---|
| 3,983,076 | A | 9/1976 | Rockstad et al. | |
| 4,466,818 | A | * 8/1984 | Brongersma | 65/405 |
| 4,908,053 | A | 3/1990 | Nishii et al. | |
| 5,958,103 | A | 9/1999 | Yoneda et al. | |
| 6,015,765 | A | 1/2000 | Harbison et al. | |
| 6,074,968 | A | 6/2000 | Yoneda et al. | |
| 6,788,864 | B2 | 9/2004 | Ahmad et al. | |
| 2009/0097805 | A1 | 4/2009 | Bayindir et al. | |

OTHER PUBLICATIONS

V. Nguyen et al, "Very Large Temperature-Induced Absorptive Loss in High Te-Containing Chalcogenide Fibers," J. Lightwave Tech., vol. 18, No. 8, Oct. 2000, pp. 1395-1401.

M.F. Churbanov, et al., "Flow of Molten Arsenic Selenide in a Cylindrical Channel," Inorganic Materials, vol. 39, No. 1, 2003, pp. 77-81.

(Continued)

*Primary Examiner*—Charlie Peng

(57) ABSTRACT

A thermally stable chalcogenide glass, a process for making the same, and an optical fiber drawn therefrom are provided. A chalcogenide glass having the composition $Ge_{(5-y)}As_{(32-x)}Se_{(59+x)}Te_{(4+y)}$ ($0 \leq y \leq 1$ and $0 \leq x \leq 2$) is substantially free from crystallization when it is heated past the glass transition temperature $T_g$ or drawn into optical fibers. A process for making the thermally stable chalcogenide glass includes purifying the components to remove oxides and scattering centers, batching the components in a preprocessed distillation ampoule, gettering oxygen impurities from the mixture, and heating the components to form a glass melt. An optical fiber formed from the chalcogenide glass is substantially free from crystallization and exhibits low signal loss in the near-infrared region, particularly at wavelengths of about 1.55 μm.

4 Claims, 6 Drawing Sheets

Differential scanning calorimetry (DSC) data of $Ge_5As_{39}Se_{61}Te_4$ glass

OTHER PUBLICATIONS

V.K. Tikhomirov, et al., "Glass formation in the Te-enriched part of the quaternary Ge-As-Se-Te system and its implication for mid-infrared optical fibres," Infrared Physics & Technology 45 (2004) pp. 115-123.

V. Nguyen et al, "Very Large Temperature-Induced absorptive Loss in High Te-Containing Chalcogenide Fibers," J. Lightwave Tech., vol. 18, No. 8, Oct. 2000, pp. 1395-1401.

M.F. Churbanov, et al., "Flow of Molten Arsenic Selenide in a Cylindrical Channel," Inorganic Material, vol. 39, No. 1, 2003, pp. 77-81.

V.K. Tikhomirov, et al., "Glass formation in the Te-enriched part of the quaternary Ge-As-Se-Te system and its implication for mid-infrared optical fibres," Infrared Phhysics & Technology 45 (2004) pp. 115-123.

* cited by examiner

SEM image showing micron-sized crystals at the $As_{39}Se_{61}$ fiber's surface

METHOD FOR FABRICATING IR-TRANSMITTING CHALCOGENIDE GLASS FIBER

CROSS-REFERENCE

This application is a divisional of and claims the benefit of priority based on U.S. patent application Ser. No. 12/210,467 filed on Sep. 15, 2008 now U.S. Pat. No. 7,693,388, the entirety of which is hereby incorporated by reference into the present application.

TECHNICAL FIELD

The present invention relates to chalcogenide glass compositions, a process for making the same, and optical fibers fabricated therefrom.

BACKGROUND

The use of fiber optic technology has greatly increased in recent years. These fibers can transmit signals in many ranges of the electromagnetic spectrum, and have found wide use in communications, remote sensing, imaging, and lasers.

Of particular interest are glass fibers for fiber optic transmission in the infrared portion of the spectrum Infrared-transmitting fiber optic technology can be used in Navy/DOD applications such as remote chemical sensor systems and sensors for use in cleanup of DOD facilities. Other important military applications of infrared-transmitting optical fibers provide superior aircraft survivability by their use in aircraft protection systems against heat-seeking missiles and laser threat warning systems. Still other applications of infrared-transmitting optical fibers include their use in high-energy infrared power delivery systems such as those using CO (5.4 µm) and $CO_2$ (10.6 µm) lasers.

In addition, infrared-transmitting optical fibers are used in a myriad of other military and civilian applications. These applications include sensors for detection of contaminants in soil or groundwater, monitoring of environmental pollution, or application in other civil/industrial processes; optical fibers used in Raman amplifiers; photonic band gap fibers; and optical ultra-fast switches for telecommunications. Infrared-transmitting fibers also have important medical uses, such as in surgery and tissue diagnostics.

Thus, there has been an increased need for high quality infrared-transmitting optical fibers. One type of optical fibers that have seen significant use in recent years are fibers made using chalcogenide glass Infrared-transmitting chalcogenide glasses and optical fibers made therefrom can be used for numerous applications involving infrared transmissions, including thermal imaging, temperature monitoring, and medical applications.

Chalcogenide glasses are made from mixtures of the chalcogen elements such as sulfur, selenium, and tellurium, which have two-folded coordination. Conventional arsenic selenide (As—Se) glass can have has a transmission range from 1 to 10 µm. However, such conventional glass tends to crystallize during reheating of the glass for fiber drawing. See M. F. Churbanov, et al., "Flow of molten arsenic selenide in a cylindrical channel," *Inorganic Materials*, Vol. 39 No. 1, pp. 77-81, 2003. The presence of such crystals increases instability of the glass and can contribute to signal loss, limiting the usefulness of such glass for optical fibers.

The addition of network formers such as germanium or arsenic establishes cross-linking and facilitates stable glass formation. Depending on their composition, chalcogenide glass optical fibers having germanium and/or arsenic constituents can transmit infrared signals in a wider range than conventional As—Se glasses, i.e., from between about 1 to 12 µm. Tellurium also may be added to As—Se glasses to extend the long wavelength transmission.

Conventional chalcogenide glasses having germanium and tellurium as constituents, however, contain these elements in high amounts. For example, U.S. Pat. No. 4,908,053 to Nishii et. al. describes an As—Se glass having additional amounts of germanium and tellurium. The Ge—As—Se—Te glass described in Nishii et al. contains a high germanium (25 mol %) and high tellurium (30 mol %) concentration. Tikhomirov et al. has also published work regarding Ge—As—Se—Te glasses having 15 mol % germanium and up to 61 mol % tellurium. See V. K. Tikhomirov, et al., "Glass-formation in the Te-enriched part of the quaternary Ge—As—Se—Te system and its implication for mid-IR fibres," submitted to Infrared Physics and Technology, March 2004.

The high tellurium concentration in the glasses described by Nishii and Tikhomirov can have significant drawbacks, however, which can limit the usefulness of such glasses for optical fibers. A high tellurium content shifts the electronic edge of the optical fiber to longer wavelengths and makes it impossible to use these glasses for applications at shorter wavelengths, particularly at 1.55 µm, which is an important wavelength for telecommunications applications. The high tellurium content in these glasses also makes the fibers more weak and fragile, further limiting their use in many applications. In addition, like conventional As—Se glasses, glasses having a high tellurium content are prone to crystallization as they are heated above the glass transition temperature $T_g$, which makes it difficult to make low-loss fibers, since the presence of crystals in the fibers contributes to signal loss. Moreover, as described by V. Q. Nguyen, et al., the high tellurium concentration increases the free carrier absorption loss at temperatures greater than 22° C., which puts a limit on the practical applications of the fibers since the temperature may not be constant. See V. Q. Nguyen, et al. "Very large temperature-induced absorptive-loss in high Te-containing chalcogenide fibers," *J. Lightwave Technology*, vol. 18, no. 10, 1395-1401, October. 2000. All of these aspects limit the usefulness of conventional Te-containing chalcogenide glasses as optical fibers.

Because of many potential applications in the mid-infrared range, there is a thus need to develop a new thermally stable glass that avoids crystallization at temperatures above the glass transition temperature $T_g$ and during fiber drawing or other re-shaping of the glass above $T_g$ and that can be used in optical fibers for transmissions from 1-10 µm with low signal loss.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

The present invention provides a thermally stable chalcogenide glass having a composition of $Ge_{(5-y)}As_{(32-x)}Se_{(59+x)}Te_{(4+y)}$ ($0 \leq y \leq 1$ and $0 \leq x \leq 2$), a process for making the same, and optical fibers made therefrom. The chalcogenide glass according to the present invention is very stable and does not crystallize when reheated for fiberizing. Optical fibers made from the chalcogenide glass compositions of the present invention exhibit low signal loss at 1.55 µm, making them suitable for many applications.

DETAILED DESCRIPTION

The aspects summarized above can be embodied in various forms. The following description shows, by way of illustration, combinations and configurations in which the aspects can be practiced. It is understood that the described aspects and/or embodiments are merely examples. It is also understood that one skilled in the art may utilize other aspects and/or embodiments or make structural and functional modifications without departing from the scope of the present disclosure.

Figure 1A:
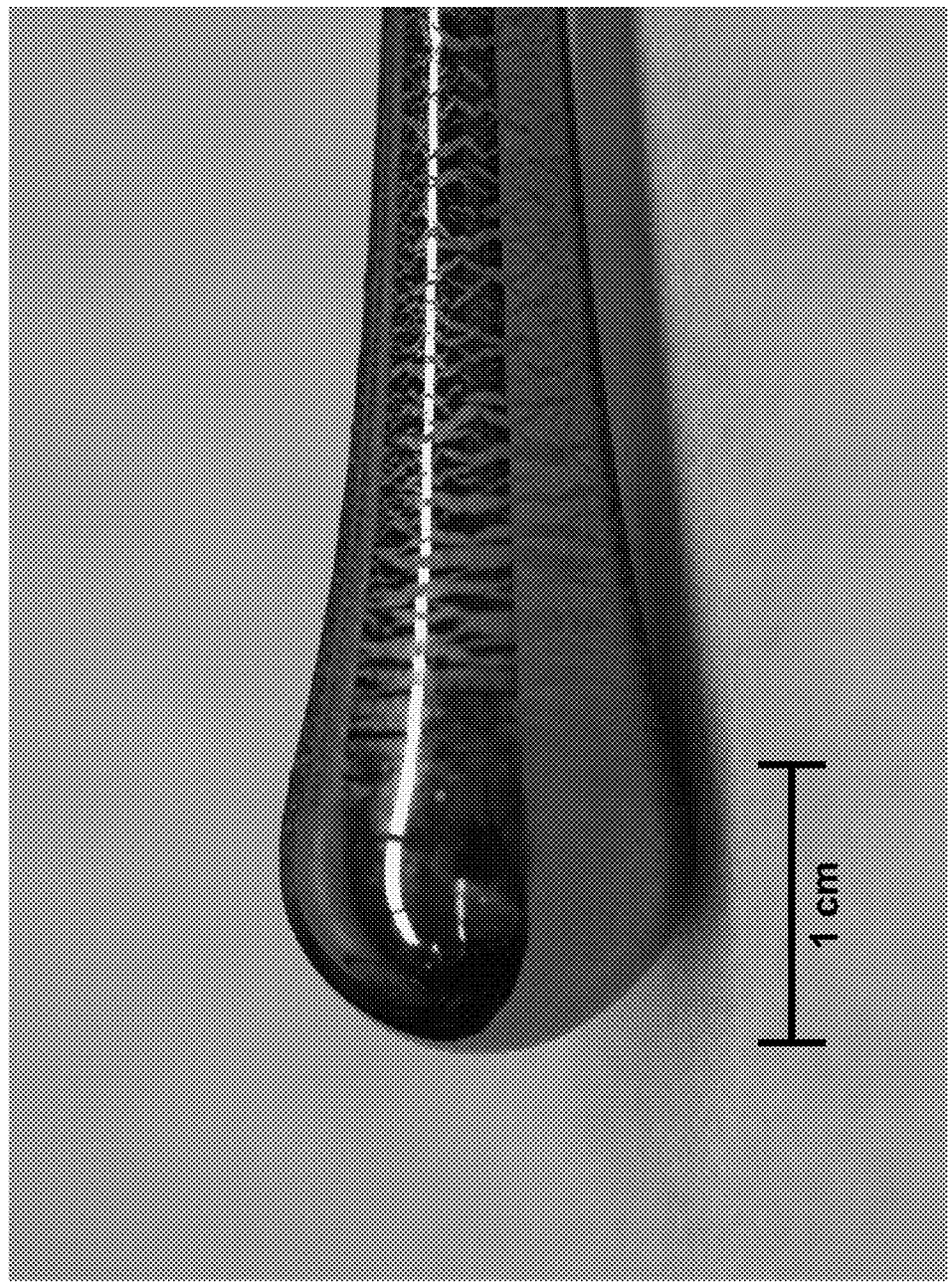
FIGS. 1A and 1B depict crystallization properties exhibited by a arsenic-selenium glass fiber according to the prior art.
Figure 1B:
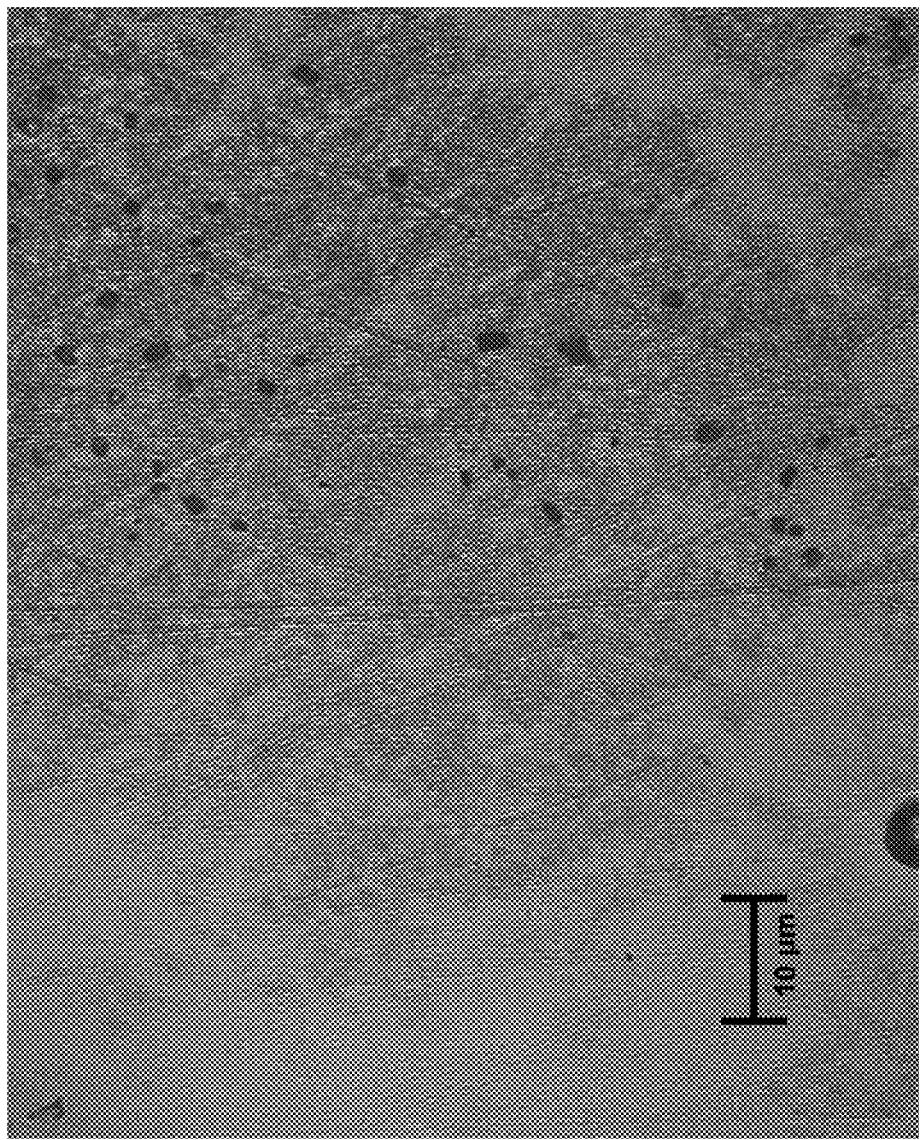

As discussed above, because of many potential applications in the mid-infrared range, there is a need to develop a new thermally stable glass that transmits from 1-10 µm. Chalcogenide glasses made from mixtures of chalcogen elements such as sulfur, selenium, and tellurium, are one form of glass often used in fiber optics in this range. Conventional chalcogenide glass optical fibers transmit from between about 1 µm to 12 µm, depending upon composition. Chalcogenide glass comprising arsenic selenide can transmit in the 1 to 10 µm range, but tends to crystallize during reheating of the glass for fiber drawing. FIGS. 1A and 1B clearly show this phenomenon. FIG. 1A depicts an $As_{39}Se_{61}$ glass fiber with the surface of the fiber exhibiting clearly defined crystallization. As seen in FIG. 1B, these surface crystals can be on the order of 1 µm or more in size. Such crystallization makes the fiber unsuitable for fiber optic transmissions, as the signal will not travel though the fiber without significant loss due to scattering on the crystals. In addition, the crystals weaken the fiber, making it unstable and unsuitable for many applications.

The present invention comprises a chalcogenide glass composition, a process for making the glass composition, and optical fibers fabricated therefrom. The composition of the present invention comprises an arsenic selenide glass with an addition of a small amount of germanium and tellurium. The resulting glass of the present invention has a composition of $Ge_{(5-y)}As_{(32-x)}Se_{(59+x)}Te_{(4+y)}$ ($0 \leq y \leq 1$ and $0 \leq x \leq 2$). As discussed below, this glass is very stable and does not crystallize when reheated for fiberizing.

Preparation of $Ge_{(5-y)}As_{(32-x)}Se_{(59+x)}Te_{(4+y)}$ Glass

A process for forming the $Ge_{(5-y)}As_{(32-x)}Se_{(59+x)}Te_{(4+y)}$ ($0 \leq y \leq 1$ and $0 \leq x \leq 2$) chalcogenide glass of the present invention includes batching the constituents of the desired chalcogenide glass composition to remove impurities, melting the components to form molten glass, quenching the glass melt to form a glass solid, and then annealing the glass to eliminate any stresses.

In an exemplary embodiment, a glass rod according to the present invention having a composition $Ge_5As_{32}Se_{59}Te_4$ (i.e., y=0 and x=0) was made this process as described in detail below.

Quantities of commercially available arsenic, selenium, and tellurium having a purity of 99.9999% were preprocessed by holding at temperatures of about 450° C., 300° C., and 475° C., respectively, for about 8 hours to bake out oxide impurities such as $As_2O_3$, $As_2O_5$, $SeO_3$, $Se_2O_3$, TeO, and $TeO_3$. The arsenic, selenium, and tellurium were sublimed/distilled further to remove scattering centers such as carbon, quartz particles, residual trapped gases, and other extraneous particles. Germanium, in the form of three times zone-refined germanium, was used as received, without pre-processing.

High-quality quartz distillation ampoules, for example, ampoules having less than 30 ppm OH, such as are available from General Electric Corporation, were etched with 50/50 mol % of HF/deionized water for 2 minutes and then were rinsed with deionized water several times. The ampoules were then dried in a vacuum oven at 115° C. for 4 hours and subsequently were further baked out with an oxygen-methane torch for 5 minutes at about 950° C.

The germanium, arsenic, selenium, and tellurium were batched in the ampoules as thus prepared inside a glove box under a dry nitrogen atmosphere. A total of 150 grams of chemicals, comprising 6.87 grams of germanium, 45.345 grams of arsenic, 88.125 grams of selenium, and 9.66 grams of tellurium precursors were batched in an ampoule. Approximately 10 ppm of elemental Al was added to this mixture to getter the oxygen impurities prior to distillation. The ampoule was evacuated for 4 hours at $1 \times 10^{-5}$ Torr, sealed using a methane/oxygen torch, and placed in a two-zone furnace for melting. The batch was heated to a temperature of 800° C. and held at 800° C. for 16 hours to form a molten glass. The molten glass was distilled at a temperature of 800° C. for 10 hours, and remelted for homogenization at a temperature of 800° C. for 16 hours. The molten glass was quenched in air to form a glass solid, and then annealed at 180° C. for 6 hours to eliminate any stresses. At the completion of the above-described steps, a $Ge_5As_{32}Se_{59}Te_4$ glass rod having a one-inch diameter and a length of about 2.5 inches was retrieved from the ampoule.

Additional glass rods comprising approximately 170 grams of chemicals were also made in a similar manner: $Ge_5As_{31.5}Se_{59.5}Te_4$ (y=0 and x=0.5); $Ge_5As_{31}Se_{60}Te_4$ (y=0 and x=1); and $Ge_5As_{30}Se_{61}Te_4$ (y=0 and x=2).

Figure 2A:
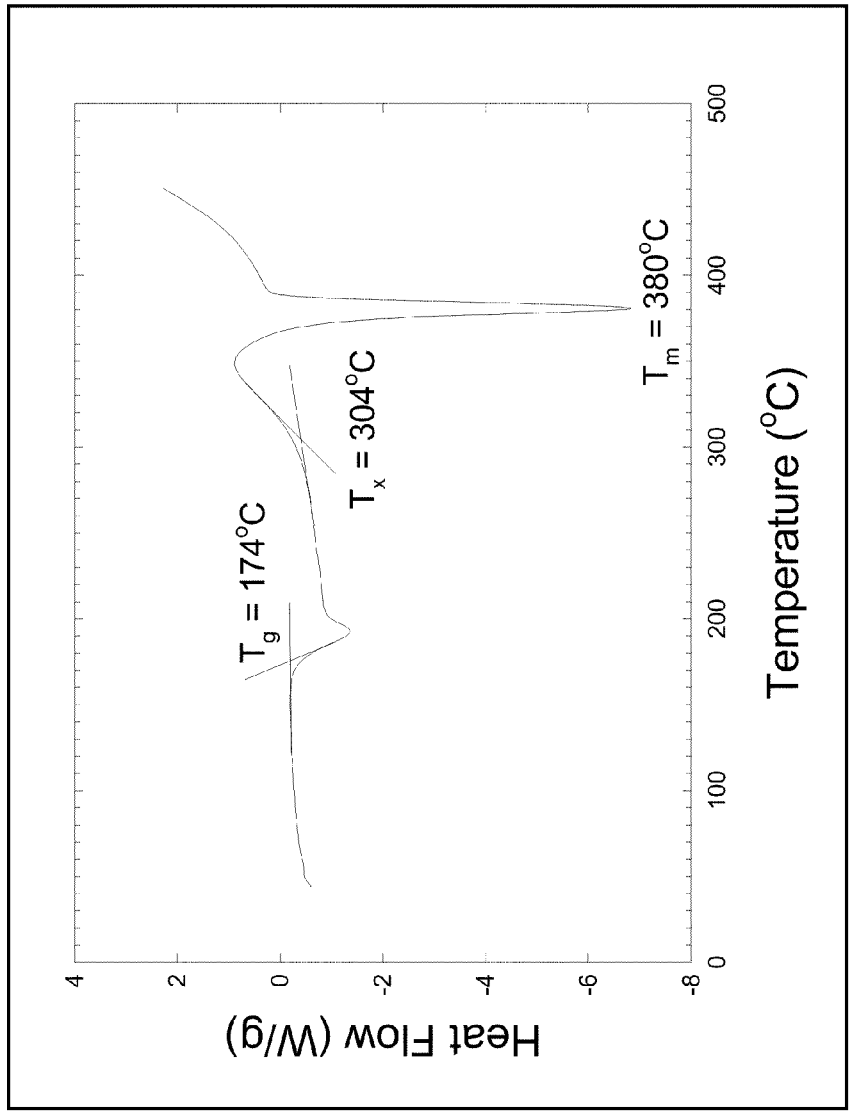
FIGS. 2A and 2B depict plots of differential scanning calorimetry (DSC) data for conventional arsenic-selenium glass and the germanium-arsenic-selenium-tellurium glass according to the present invention.
Figure 2B:
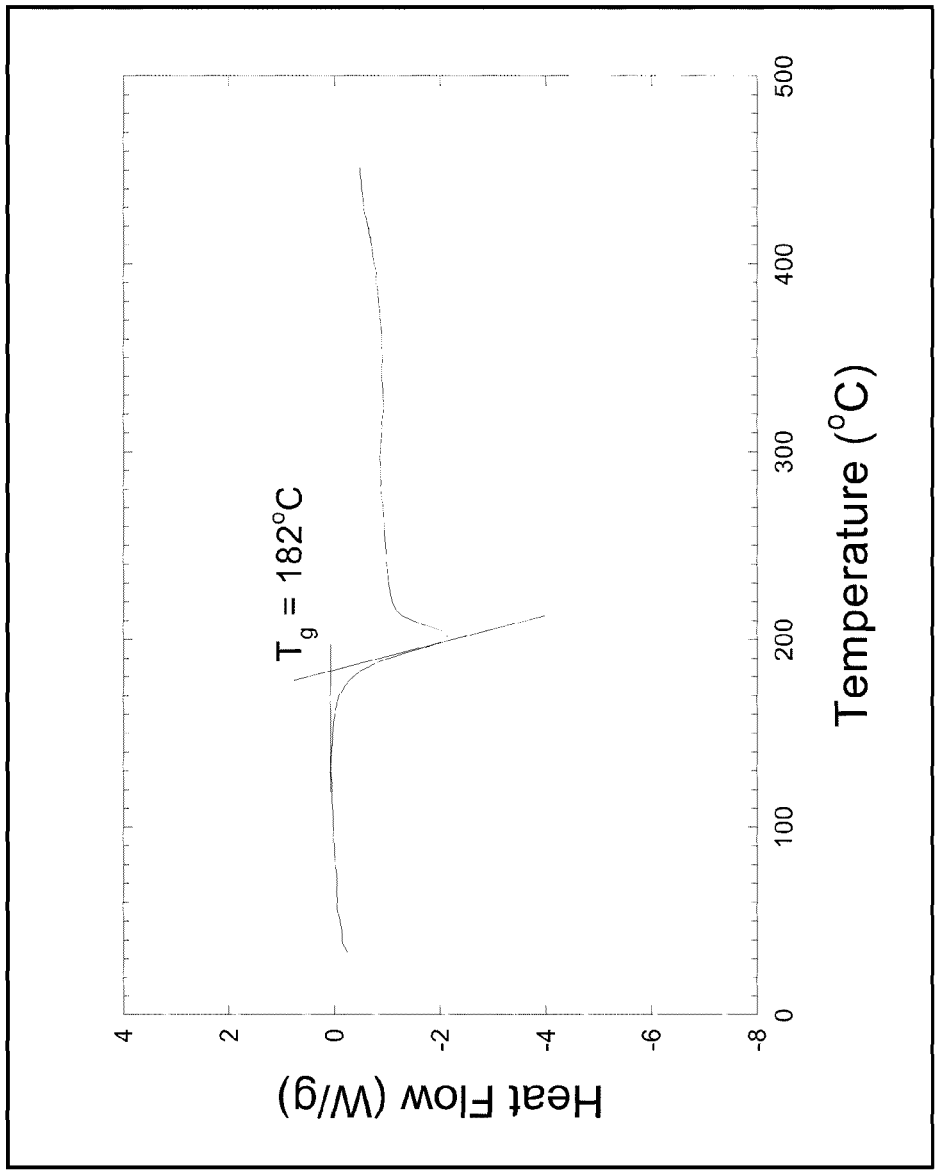

The thermal properties of the $Ge_{(5-y)}As_{(32-x)}Se_{(59+x)}Te_{(4+y)}$ glasses were investigated using differential scanning calorimetry to study the glass stability. The thermal stability properties of this glass composition are shown in FIG. 2B and contrast sharply with those of a conventional arsenic selenide glass, shown in FIG. 2A. As seen in the differential scanning calorimetry plot of conventional $As_{39}Se_{61}$ glass shown in FIG. 1C, $As_{39}Se_{61}$ exhibits a glass transition temperature $T_g$ of 174° C., at which point the material reaches its characteristic viscosity of $10^{13.6}$ poises. As the temperature is increased, the $As_{39}Se_{61}$ glass material goes from a fully amorphous phase to one that includes one or more crystal phases, as shown by the peak in heat flow at crystallization temperature $T_x$ 304° C. As the temperature is further increased, the $As_{39}Se_{61}$ glass material goes through a further phase change at the crystal melting temperature $T_m$, at which point all the crystals have melted, shown by the sharp drop in heat flow at 380° C. Thus, through the temperature range from 0 to 400° C., conventional $As_{39}Se_{61}$ glass undergoes three phase changes and is not stable once it reaches its crystallization temperature.

In contrast, the chalcogenide glass composition of the present invention is significantly more stable through this temperature range. As seen in FIG. 2B, an exemplary glass of the present invention having a composition $Ge_5As_{32}Se_{59}Te_4$ (i.e., x=0 and y=0) has a glass transition temperature $T_g$ of 182° C. Once it reaches this glass transition temperature, however, the glass of the present invention does not undergo any further phase changes. Specifically, it does not crystallize as additional heat is applied, as evidenced by the lack of any further sharp peaks or troughs in the DSC plot shown in FIG. 2B.

Similar results were found for the other glasses prepared according to the present invention. Table 1 shows the glass transition temperature $T_g$ of the $Ge_{(5-y)}As_{(32-x)}Se_{(59+x)}Te_{(4+y)}$ ($0 \leq y \leq 1$ and $0 \leq x \leq 2$) glass compositions of the present invention as a function of composition. As shown in Table 1, the different compositions exhibit different glass transition temperatures $T_g$, but like the $Ge_5As_{32}Se_{59}Te_4$ glass described above, all of the compositions within the specified ranges did not exhibit any crystallization when heated past the glass transition temperature $T_g$.

| x | y | Composition | Tg |
| --- | --- | --- | --- |
| 0.0 | 0 | $Ge_5As_{32}Se_{59}Te_4$ | 182 |
| 0.5 | 0 | $Ge_5As_{31.5}Se_{59.5}Te_4$ | 180 |
| 1.0 | 0 | $Ge_5As_{31}Se_{60}Te_4$ | 174 |
| 1.5 | 0 | $Ge_5As_{30.5}Se_{60.5}Te_4$ | 172 |
| 2 | 0 | $Ge_5As_{30}Se_{61}Te_4$ | 170 |

Fabrication into Optical Fibers

The chalcogenide glass composition of the present invention can be formed into crystal-free optical glass fibers that exhibit low signal loss.

Figure 3:
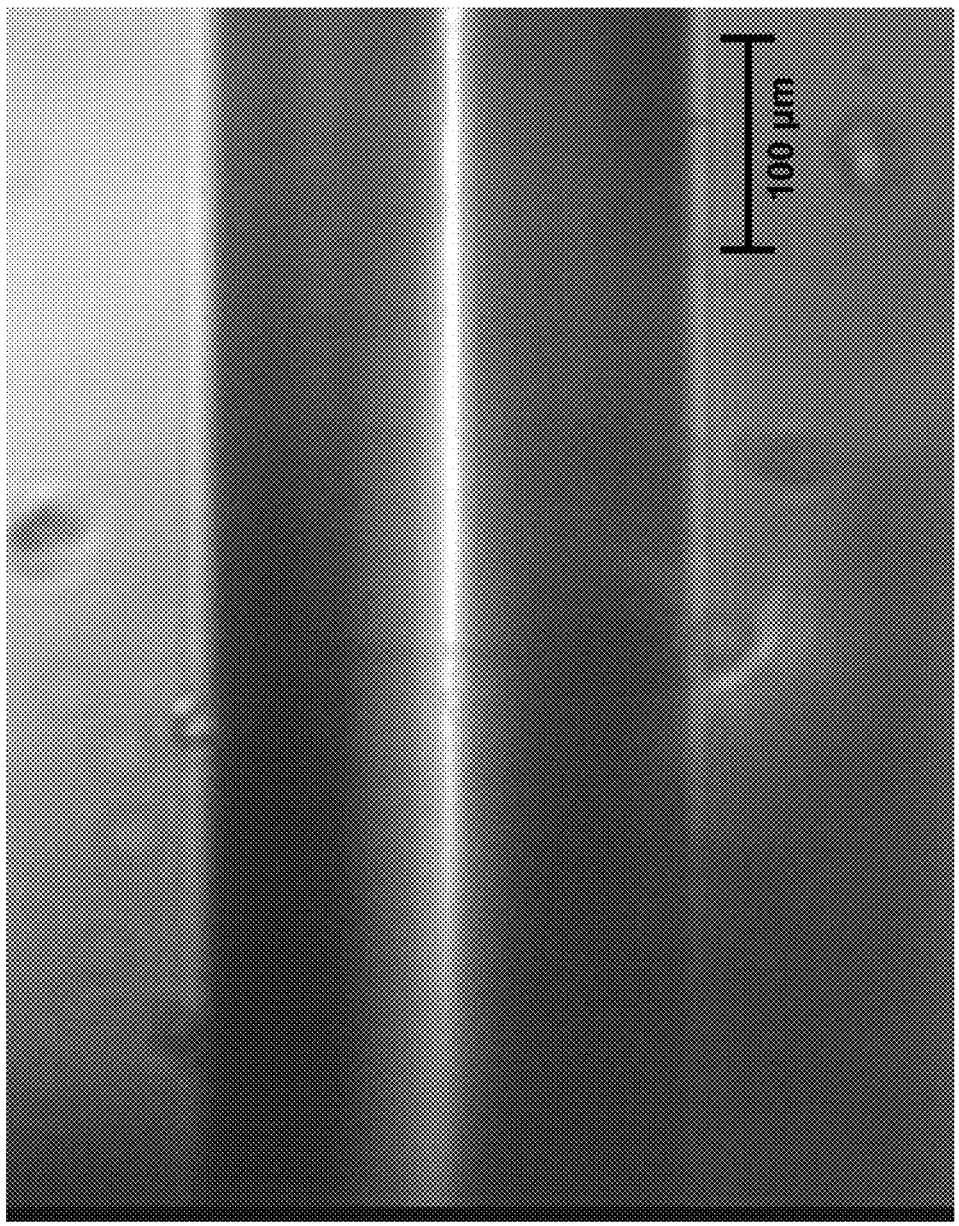
FIG. 3 depicts an optical microscopic image showing a crystal-free surface of a germanium-arsenic-selenium-tellurium glass fiber according to the present invention.

In an exemplary case, glass cullets comprising $Ge_5As_{32}Se_{59}Te_4$ core and $Ge_5As_{30}Se_{61}Te_4$ clad compositions were drawn into optical fiber using a controlled double crucible process. The fibers were drawn under an inert atmosphere at a rate of approximately 5.0 meters per minute. The resulting fibers were free of micro-crystals, both in the bulk and on the surface. The optical microscope image depicted in FIG. 3 confirms this, showing that a glass fiber according to the present invention exhibits a crystal-free surface.

Figure 4:
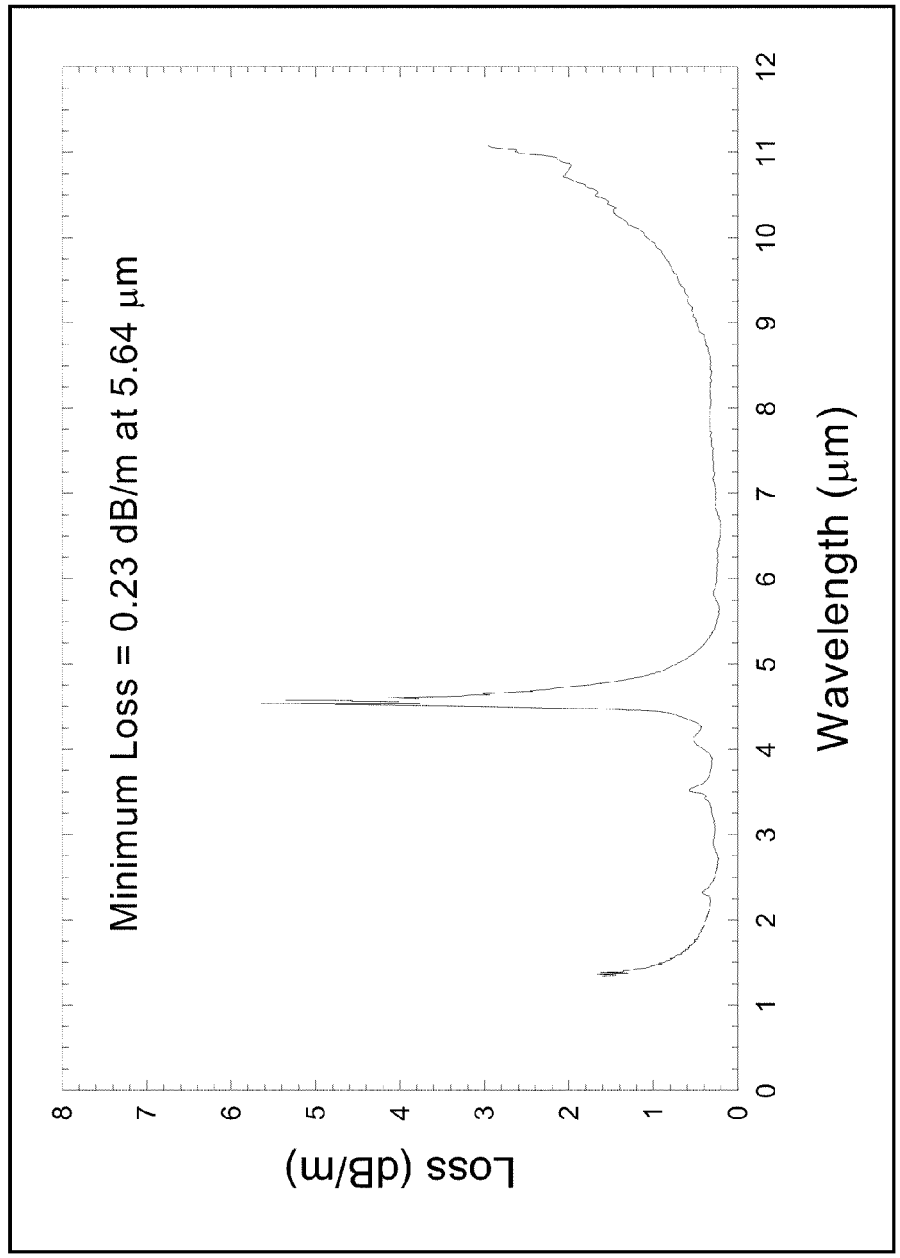
FIG. 4 depicts a plot of signal loss versus wavelength in a germanium-arsenic-selenium-tellurium glass fiber according to the present invention.

The resulting fibers also exhibit little signal loss at certain desired wavelengths. The glass composition of the present invention shifts the electronic edge to shorter wavelengths and has less signal loss at those wavelengths than conventional optical glass fibers. FIG. 4 plots signal loss as a function of wavelength in an optical fiber according to the present invention. As shown in FIG. 4, the minimum signal loss in an optical fiber comprising $Ge_5As_{32}Se_{59}Te_4$ core and $Ge_5As_{30}Se_{61}Te_4$ clad compositions is 0.23 dB/m, which occurs at a wavelength of 5.64 μm. The fiber also exhibits a low signal loss for transmissions having a wavelength of 1.55 μm, losing only 0.8 dB/m at that range. This low signal loss exhibited by optical fibers comprising $Ge_{(5-y)}As_{(32-x)}Se_{(59+x)}Te_{(4+y)}$ ($0 \leq y \leq 1$ and $0 \leq x \leq 2$) glass compositions of the present invention enables their use in many applications at 1.55 μm as well as in applications at longer wavelengths in the infrared range.

Thus, as described herein, chalcogenide glasses comprising the $Ge_{(5-y)}As_{(32-x)}Se_{(59+x)}Te_{(4+y)}$ ($0 \leq y \leq 1$ and $0 \leq x \leq 2$) glass compositions of the present invention and optical fibers made therefrom thus have several advantages over conventional glasses. For example, glasses in the new $Ge_{(5-y)}As_{(32-x)}Se_{(59+x)}Te_{(4+y)}$ ($0 \leq y \leq 1$ and $0 \leq x \leq 2$) glass system are thermally stable and do not crystallize with the application of additional heat during fiber draw, and fibers made using this glass are free of micro-crystals both in the bulk and on the surface. This results in lower signal loss through the fiber. In addition, because the $Ge_{(5-y)}As_{(32-x)}Se_{(59+x)}Te_{(4+y)}$ ($0 \leq y \leq 1$ and $0 \leq x \leq 2$) glass of the present invention contains only a small amount of tellurium, signal loss due to free carrier absorption such as occurs with conventional GeAsSeTe glasses is minimized, further enhancing the signal propagation efficiency of the fiber. Moreover, because of the absence of crystals, fibers drawn from the $Ge_{(5-y)}As_{(32-x)}Se_{(59+x)}Te_{(4+y)}$ ($0 \leq y \leq 1$ and $0 \leq x \leq 2$) glass of the present invention are not fragile and can be easily handled, which further contributes to their practicality and usefulness in many applications.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. For example, although exemplary glasses having specific values of x and y have been described, all compositions having a composition of $Ge_{(5-y)}As_{(32-x)}Se_{(59+x)}Te_{(4+y)}$ ($0 \leq y \leq 1$ and $0 \leq x \leq 2$) are within the scope and spirit of the present disclosure. In addition, the times and temperatures described in the process for making the glass composition of the present invention are approximate, and deviations may be made therefrom within the scope and spirit of the present invention.

What is claimed is:

1. A process for fabricating an optical fiber, comprising providing a first glass cullet comprising a core of the optical fiber and a second glass cullet comprising a clad of the optical fiber, wherein the first glass cullet comprises a first chalcogenide glass and the second glass cullet comprises a second chalcogenide glass, both the first and second chalcogenide glasses having a composition $Ge_{(5-y)}As_{(32-x)}Se_{(59+x)}Te_{(4+y)}$ ($0 \leq y \leq 1$ and $0 \leq x \leq 2$).

2. The process for fabricating an optical fiber according to claim 1, wherein the first chalcogenide glass has a composition $Ge_5As_{32}Se_{59}Te_4$ and the second chalcogenide glass has a composition $Ge_5As_{30}Se_{61}Te_4$.

3. The process for fabricating an optical fiber according to claim 1, further comprising drawing the first glass cullet and the second glass cullet into an optical fiber using a controlled double crucible process.

4. The process for fabricating an optical fiber according to claim 3, further comprising drawing the fiber under an inert atmosphere at a rate of about 5.0 meters per minute.

* * * * *